(12) United States Patent
Suzuki et al.

(10) Patent No.: US 6,641,878 B2
(45) Date of Patent: *Nov. 4, 2003

(54) OPTICAL PICKUP DEVICE HOLDING CONTAINER

(75) Inventors: Keiichiro Suzuki, Fukushima (JP); Masahito Tada, Fukushima (JP)

(73) Assignee: Kureha Kagaku Kogyo K.K., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,129

(22) PCT Filed: Apr. 17, 1998

(86) PCT No.: PCT/JP98/01780
§ 371 (c)(1),
(2), (4) Date: Oct. 14, 1999

(87) PCT Pub. No.: WO98/48414
PCT Pub. Date: Oct. 29, 1998

(65) Prior Publication Data
US 2003/0129333 A1 Jul. 10, 2003

(30) Foreign Application Priority Data
Apr. 18, 1997 (JP) ................................. 9-116241

(51) Int. Cl.$^7$ .................. B32B 1/00; B32B 1/02; G11B 7/00
(52) U.S. Cl. ................. 428/35.7; 428/34.1; 428/34.4; 369/44.14; 359/811; 359/812; 359/813; 359/814; 359/815; 359/816; 359/817; 359/818; 359/819; 359/820; 206/316.1
(58) Field of Search ............... 369/44.14; 359/811–820; 428/34.1, 35.7, 34.4; 206/316.1

(56) References Cited

U.S. PATENT DOCUMENTS

| | | | | | |
|---|---|---|---|---|---|
| 4,962,999 | A | * | 10/1990 | Kasuga | 350/247 |
| 5,028,461 | A | * | 7/1991 | Nakamichi | 428/34.5 |
| 5,599,864 | A | * | 2/1997 | Ogawa et al. | 524/405 |

FOREIGN PATENT DOCUMENTS

| | | | |
|---|---|---|---|
| CA | 1236642 | * | 5/1988 |
| EP | 0251649 A2 | * | 1/1988 |
| EP | 0251649 | * | 1/1988 |
| JP | 63-33775 | | 7/1988 |
| JP | 01236270 A | * | 9/1989 |
| JP | 01236270 | * | 9/1989 |
| JP | 03066756 | * | 3/1991 |
| JP | 03138808 | * | 6/1991 |
| JP | 03138808 A | * | 6/1991 |
| JP | 03198231 | * | 8/1991 |
| JP | 06006647 | * | 1/1994 |
| JP | 7-276414 | | 10/1995 |
| JP | 07276414 | * | 10/1995 |
| JP | 8-302190 | | 11/1996 |

(List continued on next page.)

OTHER PUBLICATIONS

Patent Abstracts of Japan of Japanese Reference No. 3–198231 dated Aug. 29, 1991.
Patent Abstracts of Japan of Japanese Reference No. 3–66756 dated Mar. 22, 199.

Primary Examiner—Harold Pyon
Assistant Examiner—Marc Patterson
(74) Attorney, Agent, or Firm—Dinsmore & Shohl LLP

(57) ABSTRACT

An optical pickup device-holding container, which is formed from a resin composition comprising a poly(arylene sulfide) (A) and an inorganic filler (B) and having a thermal conductivity of at least 1 W/mK; and an optical pickup device in which at least a light source, an objective lens and a light-receiving part are held in the holding container.

8 Claims, 1 Drawing Sheet

FOREIGN PATENT DOCUMENTS

| | | | |
|---|---|---|---|
| JP | 08302190 | * | 11/1996 |
| JP | 08315402 | * | 11/1996 |
| JP | 8-315402 | | 11/1996 |
| JP | 8-315406 | | 11/1996 |
| JP | 08315406 | * | 11/1996 |
| JP | 8-321067 | | 12/1996 |
| JP | 08321067 | * | 12/1996 |
| JP | 08321068 | * | 12/1996 |
| JP | 8-321068 | | 12/1996 |

* cited by examiner

OPTICAL PICKUP DEVICE HOLDING CONTAINER

21 TECHNICAL FIELD

The present invention relates to an optical pickup device-holding container, and more particularly to a holding container used for an optical pickup device adapted to irradiate an optical recording medium such as a compact disk with a light beam, receive reflected light from a recording surface to give an optical signal corresponding to a change in the reflected state of the light beam on the recording surface, and convert the optical signal into an electrical signal to conduct recording or reproduction. The present invention also relates to an optical pickup device in which components such as a light source, an objective lens and a light-receiving part are held in the holding container.

BACKGROUND ART

In recent years, optical recording mediums (optical disks) such as compact disks (CD), digital video disks (DVD), laser disks (LD) and mini disks (MD) have been widely used as various recording mediums, since they have a high memory density and a great memory capacity and are easy to random access. The recording and/or reproduction of information is conducted by irradiating a surface (recording surface) of an optical recording medium with a light beam.

An optical pickup device is used to irradiate the recording surface of the optical recording medium with the light beam for recording/reproduction. The optical pickup device is generally equipped with at least a light source, an objective lens and a light-receiving part, and those of various systems and types have been known (for example, Japanese Patent Application Laid-Open Nos. 315402/1996, 315406/1996, 321067/1996 and 321068/1996).

An example of the optical pickup device is illustrated in FIG. 1. In the optical pickup device illustrated in FIG. 1, a laser beam outputted from a semiconductor laser (light source) 1 is focused on a recording surface 8 of an optical disk 7 by an objective lens 3 through a plane half mirror (beam splitting part) 2 and a collimator lens 4. Reflected light (return light) from the recording surface is struck on a four-split photo diode (light-receiving part) 5 through the objective lens 3, the collimator lens 4 and the plane half mirror 2 to give data signals and error signals (focus error signals and tracking error signals). The objective lens 3 is moved vertically and laterally according to the error signals to conduct focus control and tracking control.

Such components as described above in the optical pickup device are generally held in a holding container 6. A metal-made holding container has heretofore been used in the optical pickup device. However, the holding container is in an extremely complicated form, since the components must be installed therein. Therefore, extremely difficult processing has been required in order to produce a metal-made holding container.

When a synthetic resin is used in place of a metal, a holding container can be easily produced by, for example, injection molding even when it has a complicated form. However, the holding container made of the synthetic resin is poor in thermal conductibility and hence involves a problem that it tends to be deformed by heat generated from the semiconductor laser and temperature rise at the light-receiving part of signal light. When the holding container is deformed even a little, there arises a problem that positions of the individual components held therein vary to cause the slippage of an optical axis. Besides, the form of a spot of the light beam on the recording surface of the recording medium is distorted by the temperature rise, and moreover the form of a light spot at the light-receiving part is also distorted, so that stable recording and reproduction become difficult.

Since a digital video disk (DVD) in particular is required to have interchangeability with other optical disks, and signals are stored in its recording surfaces different in depth from each other, it has been necessary to extremely strictly control the positions of the individual components held in the holding container in order to conduct stable recording and reproduction using such a disk. This demand is extremely strong in the conventional pickup devices for optical disks, particularly, digital video disks, and so the use of a holding container made of a synthetic resin, which tends to cause heat accumulation and heat distortion, has been difficult.

DISCLOSURE OF THE INVENTION

It is an object of the present invention to provide an optical pickup device-holding container made of a synthetic resin, which is excellent in heat resistance, dimensional stability, heat distortion resistance and thermal conductibility. A particular object of the present invention is to provide an optical pickup device-holding container suitable for digital video disks.

Another object of the present invention is to provide an optical pickup device in which components such as a light source, an objective lens and a light-receiving part are held in a holding container made of a synthetic resin, which is excellent in heat resistance, dimensional stability, heat distortion resistance and thermal conductibility.

The present inventors have carried out an extensive investigation with a view toward overcoming the above-described problems involved in the prior art. As a result, it has been found that when a resin composition comprising a poly(arylene sulfide) and an inorganic filler and having a thermal conductivity of at least 1 W/mK is used to produce an optical pickup device-holding container, a holding container excellent in heat resistance, dimensional stability, heat distortion resistance and thermal conductibility can be provided, and stable recording and reproduction can be conducted by an optical pickup device obtained by installing the components thereof in this holding container. The present invention has been led to completion on the basis of these findings.

According to the present invention, there is thus provided an optical pickup device-holding container which is formed from a resin composition comprising a poly(arylene sulfide) (A) and an inorganic filler (B) and having a thermal conductivity of at least 1 W/mK.

According to the present invention, there is also provided an optical pickup device, in which at least a light source, an objective lens and a light-receiving part are held in a holding container, wherein the holding container is formed from the above-described resin composition.

According to the present invention, there are further provided the following preferred embodiments:

1. The optical pickup device-holding container, wherein the resin composition comprises, per 100 parts by weight of the poly(arylene sulfide) (A), 50 to 300 parts by weight of metal oxide powder (B1) and 20 to 300 parts by weight of a fibrous filler (B2) as the inorganic filler (B).

2. The optical pickup device-holding container, wherein the metal oxide powder (B1) is at least one selected from the group consisting of iron oxide and aluminum oxide.

3. The optical pickup device-holding container, wherein the fibrous filler (B2) is at least one selected from the group consisting of glass fibers, carbon fibers, wollastonite, potassium titanate and aluminum borate.

4. The optical pickup device-holding container, wherein the poly(arylene sulfide) is poly(phenylene sulfide).

5. An optical pickup device equipped with the holding container according to any one of the above items 1 to 5.

BEST MODE FOR CARRYING OUT THE INVENTION

Poly(arylene Sulfide)

Figure 1:
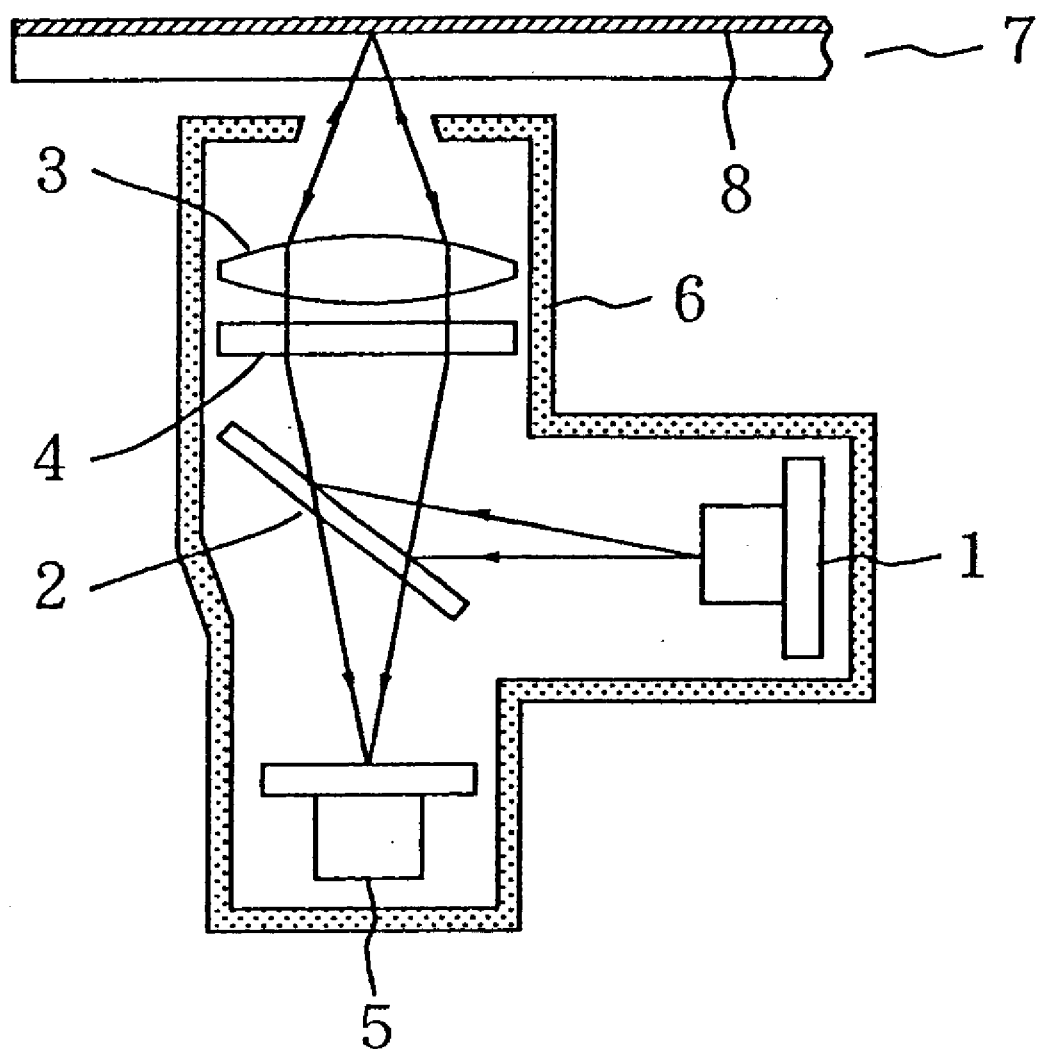
FIG. 1 is a cross-sectional view illustrating the structure of an exemplary optical pickup device.

The poly(arylene sulfide) (hereinafter abbreviated as "PAS") useful in the practice of the present invention is an aromatic polymer having predominant repeating units of arylene sulfide represented by the formula [—Ar—S—] in which Ar means an arylene group. The PAS used in the present invention is a homopolymer or copolymer containing the repeating unit of [—Ar—S—] in a proportion of generally at least 50 wt. %, preferably at least 70 wt. %, more preferably at least 90 wt. %.

As examples of the arylene group, may be mentioned a p-phenylene group, a m-phenylene group, substituted phenylene groups (the substituent being preferably an alkyl group having 1 to 6 carbon atoms or a phenyl group), a p,p'-diphenylene sulfone group, a p,p'-biphenylene group, a p,p'-diphenylenecarbonyl group and a naphthylene group. As the PAS, a polymer predominantly having only the same arylene groups may preferably be used. However, a copolymer having two or more different arylene groups may be used from the viewpoints of processability and heat resistance.

The PAS used in the present invention is preferably a linear polymer. However, a polymer partially containing a branched and/or crosslinked structure, or a crosslinked polymer subjected to a treatment (cure) for increasing its melt viscosity by oxidative crosslinking may also be used so far as it can satisfy mechanical properties.

Among these PASs, poly(phenylene sulfide) (hereinafter abbreviated as "PPS") having predominant repeating units of p-phenylene sulfide is particularly preferred because it is excellent in processability, heat resistance and dimensional stability and industrially available with ease.

Besides, poly(arylene ketone sulfides), poly(arylene ketone ketone sulfides) and the like may also be used. As specific examples of copolymers, may be mentioned random or block copolymers having repeating units of p-phenylene sulfide and repeating units of m-phenylene sulfide, random or block copolymers having repeating units of phenylene sulfide and repeating units of arylene ketone sulfide, random or block copolymers having repeating units of phenylene sulfide and repeating units of arylene ketone ketone sulfide, and random or block copolymers having repeating units of phenylene sulfide and repeating units of arylene sulfone sulfide.

These PASs are preferably crystalline polymers from the viewpoints of heat resistance, dimensional stability and the like.

Such a PAS can be obtained in accordance with the publicly known process (for example, Japanese Patent Publication No. 33775/1988) in which an alkali metal sulfide and a dihalogen-substituted aromatic compound are subjected to a polymerization reaction in a polar solvent. As examples of the alkali metal sulfide, may be mentioned lithium sulfide, sodium sulfide, potassium sulfide, rubidium sulfide and cesium sulfide. Sodium sulfide formed by the reaction of NaSH and NaOH in the reaction system may also be used.

As examples of the dihalogen-substituted aromatic compound, may be mentioned p-dichlorobenzene, m-dichlorobenzene, 2,5-dichlorotoluene, p-dibromobenzene, 2,6-dichloronaphthalene, 1-methoxy-2,5-dichlorobenzene, 4,4'-dichlorobiphenyl, 3,5-dichlorobenzoic acid, p,p'-dichlorodiphenyl ether and 4,4'-dichlorodiphenyl ketone. These compounds may be used either singly or in any combination thereof.

In order to introduce some branched or crosslinked structure into the PAS, a small amount of a polyhalogen-substituted aromatic compound having at least 3 halogen substituents per molecule may be used in combination. As preferable examples of the polyhalogen-substituted aromatic compounds, may be mentioned trihalogen-substituted aromatic compounds such as 1,2,3-trichlorobenzene, 1,2,3-tribromobenzene, 1,2,4-trichlorobenzene, 1,2,4-tribromobenzene, 1,3,5-trichlorobenzene, 1,3,5-tribromobenzene and 1,3-dichloro-5-bromobenzene, and alkyl-substituted derivatives thereof.

As the polar solvent, aprotic organic amide solvents typified by N-alkylpyrrolidones such as N-methyl-2-pyrrolidone (hereinafter abbreviated as "NMP"), 1,3-dialkyl-2-imidazolidinone, tetraalkylureas, and hexaalkylphosphoric triamides are preferred because they have high stability in the reaction system and are easy to provide a high-molecular weight polymer.

No particular limitation is imposed on the melt viscosity of the PAS used in the present invention, but the melt viscosity measured at 310° C. and a shear rate of 1,200/sec is desirably within a range of preferably 1 to 200 Pa·s, more preferably 3 to 140 Pa·s from the viewpoint of the application to melt processing techniques such as injection molding and extrusion.

Inorganic Filler

In the present invention, a resin composition comprising PAS and an inorganic filler and having a thermal conductivity of at least 1 W/mK is used as a material of the holding container. When a resin composition having a too low thermal conductivity is used to produce a holding container, heat dissipation out of the optical pickup device becomes difficult, so that the temperature within the optical pickup device is raised by heat generated from the semiconductor laser and heat derived from light energy received in the light-receiving part. As a result, the positions of the individual components held in the holding container vary to cause the slippage of an optical axis and the distortion of a light spot form, and so stable recording or reproduction of signals becomes difficult. The thermal conductivity of the resin composition is preferably about 1 to 3 W/mK.

As the inorganic filler used in the present invention, is preferred that having a relatively high thermal conductivity. That combining a high thermal conductivity with excellent dimensional stability is more preferred. Examples of powdered inorganic fillers (including particles and flakes) include powders of gold, silver, copper, aluminum, iron, zinc, silicon, germanium, molybdenum, brass, bronze, alumina (aluminum oxide), iron oxide, magnesium oxide, silicon oxide, graphite, non-graphitizable carbon, etc. These inorganic fillers may be used either singly or in any combination thereof.

Among these inorganic fillers, metal oxide powders are preferred from the viewpoint of stability in the air, with alumina and iron oxide being particularly preferred. Spherical alumina is particularly preferred. Since the hardness of alumina is very high, the spherical alumina is preferred from the viewpoint of preventing extruders, injection molding machines, molds and the like from being worn. The average particle size of the alumina is generally within a range of 3 to 100 $\mu$m, preferably 5 to 80 $\mu$m, more preferably 8 to 50 $\mu$m from the viewpoint of flowability. As the iron oxide, are particularly preferred ferrite compounds typified by spinel type ferrites such as Ni—Zn ferrite, Mn—Zn ferrite, Mg—Zn ferrite and Cu ferrite; magnetoplumbite type ferrites such as Ba ferrite and Sr ferrite; and $\gamma$-iron oxide. The average particle size of the iron oxide is generally within a range of 1 to 100 $\mu$m, preferably 2 to 80 $\mu$m, more preferably 2 to 50 $\mu$m from the viewpoint of flowability. The average particle size can be measured by means of, for example, a scanning electron microscope (SEM).

In the present invention, a fibrous filler may be used as the inorganic filler. Examples of the fibrous filler include glass fibers, carbon fibers, alumina fibers, stainless steel fibers, aluminum fibers, copper fibers, brass fibers, potassium titanate fibers, slag fibers, wollastonite fibers, zonorite fibers, phosphate fibers, calcium sulfate fibers, asbestos fibers, magnesium hydroxide fibers, silicon carbide fibers, silicon nitride fibers, boron fibers and aluminum borate. These fibrous fillers may be used either singly or in any combination thereof. Among the fibrous fillers, at least one selected from the group consisting of glass fibers, carbon fibers, wollastonite, potassium titanate and aluminum borate is particularly preferred from the viewpoints of stability in the air and easy industrial availability.

The powdered inorganic fillers and fibrous fillers may be those subjected to a surface treatment with a coupling agent such as a silane coupling agent, titanate coupling agent or aluminum coupling agent.

As the inorganic filler, are preferably used in combination the powdered inorganic filler mainly contributing to the improvement of thermal conductibility and the fibrous filler mainly contributing to strength and dimensional stability. The powdered inorganic filler is generally compounded in a proportion of 50 to 300 parts by weight, preferably 70 to 200 parts by weight, more preferably 80 to 150 parts by weigh per 100 parts by weight of the PAS. If the compounding proportion of the inorganic filler is too low, it is difficult to provide a resin composition having high thermal conductibility. If the proportion is too high, the resulting resin composition has a possibility that its melt moldability and mechanical strength may be deteriorated. The fibrous filler is generally compounded in a proportion of 20 to 300 parts by weight, preferably 30 to 200 parts by weight, more preferably 50 to 150 parts by weigh per 100 parts by weight of the PAS. If the compounding proportion of the fibrous filler is too low, its improving effect on mechanical strength and dimensional stability becomes little. If the proportion is too high, the resulting resin composition has a possibility that its melt moldability may be deteriorated.

Resin Composition

The resin composition used in the present invention is a resin composition comprising a poly(arylene sulfide) and an inorganic filler and having a thermal conductivity of at least 1 W/mK. To the resin composition according to the present invention, may be added an antioxidant, lubricant, parting agent, nucleating agent, flame retardant, colorant, impact modifier, thermosetting resin, any other thermoplastic resin, etc. so far as no detrimental influence is thereby imposed on the objects of the present invention.

The resin composition according to the present invention can be prepared by equipment and methods generally used in the preparation of thermoplastic resin compositions. More specifically, necessary components can be mixed and kneaded in a single-screw or twin-screw extruder and extruded into pellets for molding.

Holding Container and Optical Pickup Device

The resin composition can be molded into a holding container by injecting it into a mold. According to the injection molding of the resin composition, there is no need for complicated and difficult processing that is required of the metal-made holding containers. Necessary parts may also be formed by means of extrusion and press molding other than injection molding.

The form of the holding container may be suitably determined according to the kinds and arranged state of components held therein. An optical pickup device generally has a structure that at least a light source, an objective lens and a light-receiving part are held in the holding container. In many cases, the pickup device is also equipped with a beam splitting part, a collimator lens, etc. An example of the optical pickup device is illustrated in FIG. 1. However, the holding container and optical pickup device according to the present invention are not limited thereto.

EXAMPLES

The preferred embodiments of the present invention will hereinafter be described more specifically by the following examples.

(1) Measuring Method of Thermal Conductivity

The thermal conductivity of each resin composition sample is measured in accordance with ASTM C 201.

Example 1

Poly(phenylene sulfide) (W203, product of Kureha Kagaku Kogyo K.K.; melt viscosity measured at 310° C. and a shear rate of 1200/sec: 30 Pa·s; 8 kg) and alumina (AS-50, product of Showa Denko K.K.; spherical particles of $\alpha$-alumina having an average particle size of 10 $\mu$m; 8 kg) were charged into a 20-liter Henschel mixer and mixed for about 3 minutes. Glass fibers (GLK, product of Nippon Electric Glass Co., Ltd.; 4 kg) were then added thereto, and the contents were stirred for 30 seconds to obtain a mixture. The resultant mixture was fed to a twin-screw extruder controlled to a temperature of 280 to 320° C. and melted and kneaded, thereby obtaining a resin composition in the form of pellets. The thermal conductivity of the resin composition thus obtained was 1.5 W/mK.

The pellet-like resin composition obtained above was fed to an injection molding machine the cylinder temperature of which was controlled to from 280° C. to 320° C., and injected into a mold controlled to from 150° C. to 160° C. to mold it into an optical pickup device-holding container.

A semiconductor laser, a beam splitting part and a light-receiving part were installed in the thus-obtained optical pickup device-holding container to conduct reproduction of optical disks. As a result, the reproduction was certainly feasible over a long period of time without any problem.

Example 2

Poly(phenylene sulfide) (W203, product of Kureha Kagaku Kogyo K.K.; melt viscosity measured at 310° C. and a shear rate of 1200/sec: 30 Pa·s; 8 kg) and powder (average particle size: 3 µm; 8 kg) of Mn—Zn ferrite were charged into a 20-liter Henschel mixer and mixed for about 3 minutes. Glass fibers (GLK, product of Nippon Electric Glass Co., Ltd.; 4 kg) were then added thereto, and the contents were stirred for 30 seconds to obtain a mixture. The resultant mixture was fed to a twin-screw extruder controlled to a temperature of 280 to 320° C. and melted and kneaded, thereby obtaining a resin composition in the form of pellets. The thermal conductivity of the resin composition thus obtained was 1.2 W/mK.

The pellet-like resin composition obtained above was fed to an injection molding machine the cylinder temperature of which was controlled to from 280° C. to 320° C., and injected into a molded controlled to from 150° C. to 160° C. to mold it into an optical pickup device-holding container.

A semiconductor laser, a beam splitting part and a light-receiving part were installed in the thus-obtained optical pickup device-holding container to conduct reproduction of optical disks. As a result, the reproduction was certainly feasible over a long period of time without any problem.

Comparative Example 1

Poly(phenylene sulfide) (W203, product of Kureha Kagaku Kogyo K.K.; melt viscosity measured at 310° C. and a shear rate of 1200/sec: 30 Pa·s; 7 kg) and calcium carbonate (MAMAKARUSO, product of Nitto Funka Kogyo K.K.; 6 kg) were charged into a 20-liter Henschel mixer and mixed for about 3 minutes. Glass fibers (product of Nippon Electric Glass Co., Ltd.; diameter: 13 µm; 7 kg) were then added thereto, and the contents were stirred for 30 seconds to obtain a mixture. The resultant mixture was fed to a twin-screw extruder controlled to a temperature of 280 to 320° C. and melted and kneaded, thereby obtaining a resin composition in the form of pellets. The thermal conductivity of the resin composition thus obtained was 0.5 W/mK.

The pellet-like resin composition obtained above was fed to an injection molding machine the cylinder temperature of which was controlled to from 280° C. to 320° C., and injected into a molded controlled to from 150° C. to 160° C. to mold it into an optical pickup device-holding container.

A semiconductor laser, a beam splitting part and a light-receiving part were installed in the thus-obtained optical pickup device-holding container to conduct reproduction of optical disks. As a result, slippage of the optical axis occurred when the time went on, so that reproduced signals became unstable.

INDUSTRIAL APPLICABILITY

According to the present invention, there can be provided optical pickup device-holding containers made of a synthetic resin, which are excellent in heat resistance, dimensional stability, heat distortion resistance and thermal conductibility. The holding containers according to the present invention are particularly suitable for recording/reproduction in digital video disks. According to the present invention, there can be provided optical pickup devices in which components such as a light source, an objective lens and a light-receiving part are held in the holding container made of a synthetic resin, which is excellent in heat resistance, dimensional stability, heat distortion resistance and thermal conductibility. Since the holding containers according to the present invention are obtained by melt molding the resin composition, the degree of freedom of shape is extremely high compared with those made of a metal, and moreover productivity thereof is also extremely high.

What is claimed is:

1. An optical pickup device-holding container for holding an optical pickup device equipped with at least a light source, an objective lens and a light-receiving part, wherein the holding container is formed of a resin composition comprising 100 parts by weight of a poly(arylene sulfide) having a melt viscosity of from 3 to 140 Pa·s as measured at 310° C. and a shear rate of 1,200/sec, 80 to 150 parts by weight of at least one metal oxide powder selected from the group consisting of spherical alumina having an average particle size of from 8 to 50 µm and ferrite compounds having an average particle size of from 2 to 50 µm, and 20 to 300 parts by weight of a fibrous filler selected from the group consisting of glass fibers, carbon fibers, wollastonite, potassium titanate and aluminum borate, the resin composition having a thermal conductivity of at least 1 W/mK.

2. The optical pickup device-holding container according to claim 1, wherein the thermal conductivity of the resin composition is within a range of 1 to 3 W/mK.

3. The optical pickup, device-holding container according to claim 1, wherein the poly(arylene sulfide) is a poly(phenylene sulfide).

4. The optical pickup device-holding container according to claim 1, wherein the metal oxide powder comprises a ferrite compound selected from the group consisting of Ni—Zn ferrite, Mn—Zn ferrite, Cu ferrite, Ba ferrite and Sr ferrite.

5. An optical pickup device, in which at least a light source, an objective lens and a light-receiving part are held in a holding container, wherein the holding container is formed of a resin composition comprising 100 parts by weight of a poly(arylene sulfide) having a melt viscosity of from 3 to 140 Pa·s as measured at 310° C. and a shear rate of 1,200/sec, 80 to 150 parts by weight of at least one metal oxide powder selected from the group consisting of spherical alumina having an average particle size of from 8 to 50 µm and ferrite compounds having an average particle size of from 2 to 50 µm, and 20 to 300 parts by weight of a fibrous filler selected from the group consisting of glass fibers carbon fibers wollastonite potassium titanate and aluminum borate, the resin composition having a thermal conductivity of at least 1 W/mK.

6. The optical pickup device according to claim 5, wherein the thermal conductivity of the resin composition is within a range of 1 to 3 W/mK.

7. The optical pickup device according to claim 5, wherein the poly(arylene sulfide) is a poly(phenelene sulfide).

8. The optical pickup device according to claim 5, wherein the metal oxide powder comprises a ferrite compound selected from the group consisting of Ni—Zn ferrite Mn—Zn ferrite, Cu ferrite and Sr ferrite.

* * * * *

UNITED STATES PATENT AND TRADEMARK OFFICE
CERTIFICATE OF CORRECTION

PATENT NO. : 6,641,878 B2
DATED : November 4, 2003
INVENTOR(S) : Keiichiro Suzuki et al.

It is certified that error appears in the above-identified patent and that said Letters Patent is hereby corrected as shown below:

<u>Column 8,</u>
Lines 51-52, change "glass fibers carbon fibers wollastonite potassium" to
-- glass fibers, carbon fibers, wollastonite, potassium --.
Line 59, change "poly(phenelene" to -- poly(phenylene --.

Signed and Sealed this

Sixteenth Day of March, 2004

JON W. DUDAS
*Acting Director of the United States Patent and Trademark Office*